Nov. 30, 1937.                W. A. McCUTCHEON                2,100,608
                         COIN SELECTION PROGRAM SYSTEM
                              Filed Nov. 6, 1936
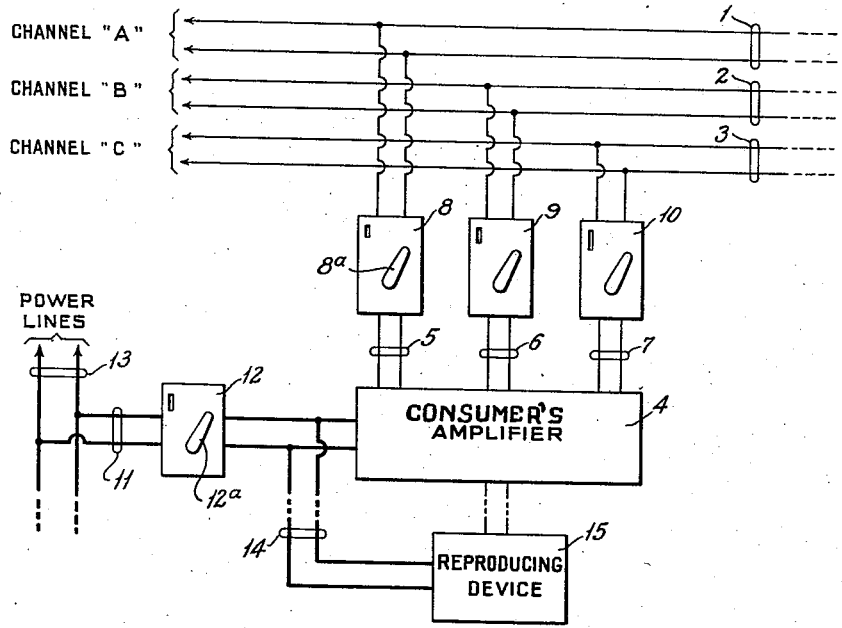
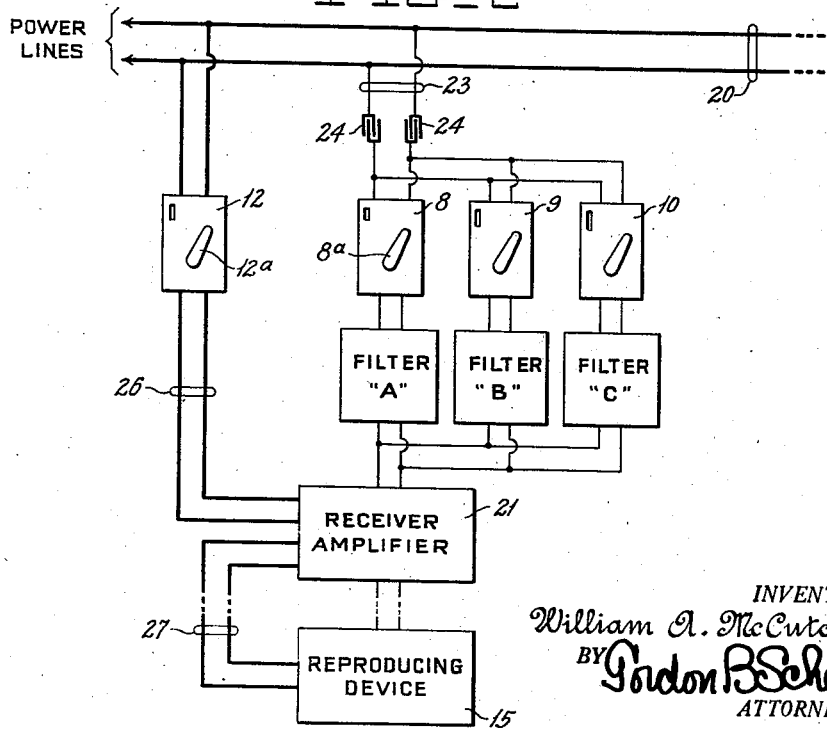
INVENTOR.
William A. McCutcheon
BY Gordon B. Scheibell
ATTORNEY.

Patented Nov. 30, 1937

2,100,608

UNITED STATES PATENT OFFICE 2,100,608

COIN SELECTION PROGRAM SYSTEM

William A. McCutcheon, East Williston, N. Y., assignor to Muzak Corporation, New York, N. Y., a corporation of Ohio Application November 6, 1936, Serial No. 109,492

2 Claims. (Cl. 179—2.5)

This invention pertains to program systems and specifically relates to a coin controlled program distribution system.

One of the objects of the invention consists in producing a program redistribution system for enabling the consumer to select one of several different classes of program service through coin operated selection apparatus.

A further object comprises providing a program distribution system embracing a plurality of program service channels which can be made individually effective for the reproduction of a particular program from one of these channels upon insertion of a suitable coin in a selected one of several coin operated controlling devices.

These and other objects will be apparent from the following, taken in conjunction with the accompanying drawing in which like reference numerals designate like parts and in which:

Fig. 1 is a diagrammatic representation of one embodiment of the invention showing a reproducing system with coin controlled program selection; and Fig. 2 is a diagrammatic representation of an alternative form of the invention.

The invention contemplates the provision of a coin controlled program system wherein the insertion of coins controls the selection of programs for reproduction. In accordance with the invention, a plurality of coin operated devices are provided for controlling different program channels available at the program reproducer whereby various ones of the programs can be reproduced under control of coin mechanism.

Referring to the drawing in detail, and particularly to Fig. 1, wire line pairs 1, 2 and 3 convey audio frequency program signals to the place of program reproduction. The lines 1, 2 and 3 correspond to different program channels designated as "A", "B", and "C". These program channels embrace different types of program material and, in accordance with the system of the invention, originate at different studios to provide different classes of service. For example, each of the program channels may provide program services having different consumers' costs, requiring payment of different charges for use of the programs at the consumers' premises.

A consumer's amplifier 4 is provided with a plurality of input circuits 5, 6 and 7, respectively connected with the wire pairs 1, 2 and 3. Interposed in the circuits 5, 6 and 7 are coin operated devices 8, 9 and 10. The devices 8, 9 and 10 are of standard or commercial form and each is adapted to receive a coin of different denomination for releasing a handle, such as the handle 8a, to close a circuit switch which is maintained in closed condition for a predetermined period by a timing mechanism contained within the coin operated device. When this predetermined period expires, the switch is automatically opened, thereby interrupting the circuit. By the use of such devices, the signal input to the amplifier 4 is selected from any one of the program classes merely by insertion of the proper coin in a selected one of the coin operated devices and movement of the handle thereof.

In accordance with a typical embodiment of the invention, the power energizing circuit 11 to the amplifier 4 is extended through a coin operated device 12 to the commercial power distribution lines 13. The device 12 is similar to the devices 8—10, except that the insertion of a coin therein may provide a relatively much longer period of circuit completion so that the energizing circuit to the amplifier is maintained during various successive operations of the devices 8—10 for reproduction of different programs. In the embodiment of the invention shown, the circuit 11 includes a subsidiary circuit 14 extending to a reproducing device 15. The reproducing device 15 comprises means for reproducing programs and the circuit 14 provides operating voltages. For example, the reproducing device 15 can include electron tubes and a power speaker energized by the circuit 14. However, in another instance, the reproducing device 15 may comprise no more than a speaker of the permanent magnet field type. In the embodiment shown in Fig. 1, the energizing circuit for the device 15 is controlled by the coin operated mechanism 12 as is the energizing circuit from the amplifier 4.

When it is desired to operate the system shown in Fig. 1 for the reproduction of selected programs, a suitable coin is deposited in the coin device 12 and the handle 12a thereof is moved to initiate the operation. When the switch is thus closed, the amplifier 4 and reproducing device 15 are energized. Thereupon, a coin of a suitable denomination can be deposited in any one of the devices 8—10. Upon reception of a coin in a selected one of the devices 8—10, the handle thereof can be moved, whereupon a desired one of the programs becomes available to the amplifier 4 for reproduction by the reproducing device 15.

In another form of the invention, the programs are transmitted over the power lines 20 as carrier frequencies. For example, the audio signals comprising the channels A, B and C appear as side band frequencies of a plurality of discrete carrier frequencies simultaneously impressed upon the power lines 20. In this form of the invention, as shown in Fig. 2, a receiver amplifier 21 is provided having frequency characteristics such that it may receive, amplify, and detect program signals within a frequency band embracing all of the discrete carrier frequency program ranges mentioned. The input circuit to amplifier 21 extends through selection networks designated as filters A, B and C corresponding to the different program channels. Each of these filters is designed to pass carrier frequency energy respectively within the frequency ranges of the different program channels.

As shown in Fig. 2, the input circuit 23 extends from the power lines 20 through capacitive couplings 24 to the filters A, B and C. The coin operated devices 8, 9 and 10 are provided immediately adjacent the filters A, B and C so that the operation of any one of the devices will operably connect a particular filter with the power lines 20 over circuit 23 extending through capacitive couplings 24. The capacitive couplings 24 prevent the commercial power from traversing the signal circuit but permit signalling energy to pass freely thereover.

An energizing circuit 26 extends through the coin operated device 12 to the receiver amplifier 21. A side energizing circuit extends from the power pack of the receiver amplifier 21 to the reproducing device 15, although, as before pointed out, such an energizing circuit may be dispensed with, when desired.

In the operation of the system of Fig. 2, the coin operated device 12 is operated with a suitable coin, as before, to energize the receiver amplifier 21 and reproducing device 15. Upon such energization, a coin of the necessary denomination may be inserted in a selected one of the devices 8—10 to render any one of the filters A, B or C effectively operable to pass signalling energy to the receiver amplifier 21. This signalling energy is received, amplified and supplied to the reproducing device 15 for the reproduction of a desired program.

Although two forms of coin selection program system have been disclosed, it will be apparent that various other forms and modifications can be made without departing from the intended scope of the invention. Therefore, no limitation is intended except as imposed by the scope of the appended claims.

What I claim as new and desire to secure by Letters Patent of the United States is:

1. A coin selection program system comprising, an amplifier, a reproducing device associated therewith, wire lines for supplying commercial power to said amplifier, a coin controlled time switch in said wire lines for controlling the energization of said amplifier and associated reproducing device, means for delivering a plurality of different program channels to said amplifier, including a coin controlled time switch for controlling, subordinate to the control exercised by said time switch controlled energization of said amplifier, each of said channels to selectively connect any one of said program channels to said amplifier and reproducing device for reproducing a program from a selected program channel for a time interval equal to a fraction only of the time interval during which said amplifier is energized by a single operation of the time switch controlling said amplifier.

2. A coin selection program system comprising, an amplifier, a reproducing device associated therewith, wire lines for supplying commercial power to said amplifier, a coin controlled time switch in said wire lines for controlling the energization of said amplifier and associated reproducing device, means for delivering a plurality of different program channels to said amplifier, including a plurality of selection circuits of different frequency characteristics, a coin controlled time switch associated with each of said selection circuits for rendering subordinate to the control exercised by said coin controlled switch in said wire lines a selected one of said circuits effective to transmit a selected program channel to said amplifier and reproducing device for reproducing a program from a selected channel for a time interval equal to a fraction only of the time interval during which said amplifier is energized by a single operation of the time switch controlling said amplifier.

WILLIAM A. McCUTCHEON.